(12) United States Patent
Canepa et al.

(10) Patent No.: US 10,754,555 B2
(45) Date of Patent: *Aug. 25, 2020

(54) LOW OVERHEAD MAPPING FOR HIGHLY SEQUENTIAL DATA

(71) Applicant: Seagate Technology LLC, Cupertino, CA (US)

(72) Inventors: Timothy Canepa, Los Gatos, CA (US); Jeffrey Munsil, Fort Collins, CO (US); Jackson Ellis, Fort Collins, CO (US); Mark Ish, Sandy Springs, GA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,733

(22) Filed: Nov. 27, 2018

(65) Prior Publication Data
US 2019/0095341 A1   Mar. 28, 2019

Related U.S. Application Data

(63) Continuation of application No. 15/606,502, filed on May 26, 2017, now Pat. No. 10,140,215.

(51) Int. Cl.
*G06F 12/02* (2006.01)
*G06F 3/06* (2006.01)

(52) U.S. Cl.
CPC ........ *G06F 3/0613* (2013.01); *G06F 3/061* (2013.01); *G06F 3/064* (2013.01); *G06F 3/0631* (2013.01); *G06F 3/0679* (2013.01); *G06F 12/0246* (2013.01); *G06F 2212/7201* (2013.01); *G06F 2212/7205* (2013.01); *G06F 2212/7208* (2013.01)

(58) Field of Classification Search
None
See application file for complete search history.

(56) References Cited

U.S. PATENT DOCUMENTS

| | | | |
|---|---|---|---|
| 5,276,826 A | * | 1/1994 | Rau ................... G06F 12/0607 710/60 |
| 6,804,741 B2 | | 10/2004 | Cowan |
| 7,844,778 B2 | | 11/2010 | Shen et al. |
| 8,009,471 B2 | | 8/2011 | Haines et al. |
| 8,495,299 B2 | | 7/2013 | Fuller et al. |
| 8,533,401 B2 | | 9/2013 | Edirisooriya et al. |

(Continued)

*Primary Examiner* — Brian R Peugh
(74) *Attorney, Agent, or Firm* — Hall Estill Attorneys at Law

(57) ABSTRACT

Method and apparatus for managing data in a memory, such as a flash memory. A memory module has a non-volatile memory (NVM) and a memory module electronics (MME) circuit configured to program data to and read data from solid-state non-volatile memory cells of the NVM. A map structure associates logical addresses of user data blocks with physical addresses in the NVM at which the user data blocks are stored. A controller circuit arranges the user data blocks into map units (MUs), and directs the MME circuit to write the MUs to a selected page of the NVM. The controller circuit updates the map structure to list only a single occurrence of a physical address for all of the MUs written to the selected page. The map structure is further updated to list an MU offset and an MU length for each of the MUs written to the selected page.

23 Claims, 5 Drawing Sheets

(56) References Cited

U.S. PATENT DOCUMENTS

| | | |
|---|---|---|
| 9,148,172 B2 | 9/2015 | Manning et al. |
| 9,250,901 B2 | 2/2016 | Sodhi et al. |
| 9,405,672 B2 | 8/2016 | Canepa et al. |
| 9,552,163 B1 | 1/2017 | Chun |
| 2009/0164721 A1 | 6/2009 | Miyata |
| 2013/0332700 A1 | 12/2013 | Kopylovitz et al. |
| 2014/0047170 A1 | 2/2014 | Cohen et al. |
| 2015/0220277 A1 | 8/2015 | Lee et al. |

* cited by examiner

FORWARD TABLE ENTRIES (FTEs)
| | LBA | ADDRESS (DIE, GCU, PAGE) | MU OFFSET | MU LENGTH |
|---|---|---|---|---|
| MU (Y) | 0 | D, C, P | A | B |
| | 1 | (SAME) | (SAME) | (SAME) |
| | 2 | ↓ | ↓ | ↓ |
| | 3 | | | |
| | 4 | | | |
| | ... | | | |
| MU (Y+1) | M | | C | D |
| | M+1 | | (SAME) | (SAME) |
| | M+2 | | ↓ | ↓ |
| | M+3 | | | |
| | M+4 | | | |
| | ... | | | |
FIG. 6
HEADER FORMAT
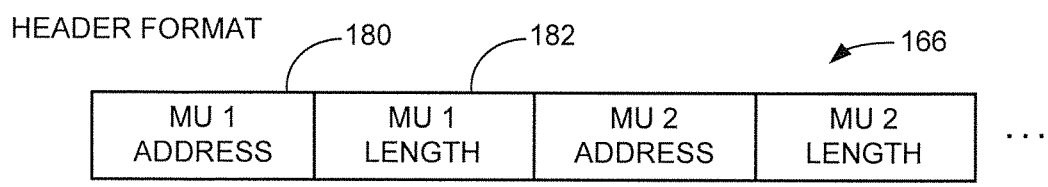
| MU 1 ADDRESS | MU 1 LENGTH | MU 2 ADDRESS | MU 2 LENGTH | ... |
FIG. 7
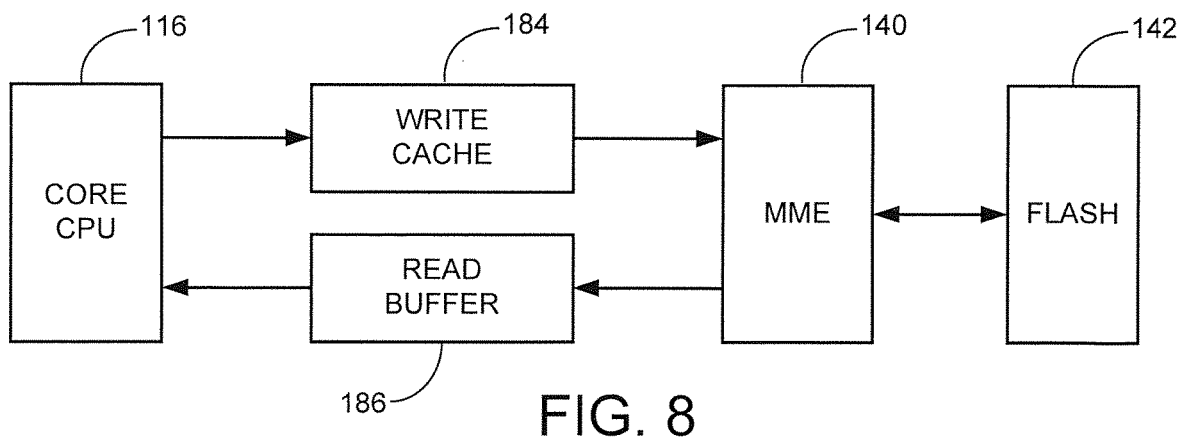
FIG. 8

LOW OVERHEAD MAPPING FOR HIGHLY SEQUENTIAL DATA

RELATED APPLICATION

The present application is a continuation of U.S. patent application Ser. No. 15/606,502 filed May 26, 2017, which issued as U.S. Pat. No. 10,140,215 on Nov. 27, 2018.

SUMMARY

Various embodiments of the present disclosure are generally directed to the management of data in a memory, such as but not limited to a flash memory.

In accordance with some embodiments, a memory module has a non-volatile memory (NVM) and a memory module electronics (MME) circuit configured to program data to and read data from solid-state non-volatile memory cells of the NVM. A map structure associates logical addresses of user data blocks with physical addresses in the NVM at which the user data blocks are stored. A controller circuit arranges the user data blocks into map units (MUs), and directs the MME circuit to write the MUs to a selected page of the NVM. The controller circuit updates the map structure to list only a single occurrence of a physical address for all of the MUs written to the selected page. The map structure is further updated to list an MU offset and an MU length for each of the MUs written to the selected page.

These and other features which may characterize various embodiments can be understood in view of the following detailed discussion and the accompanying drawings.

BRIEF DESCRIPTION OF THE DRAWINGS

FIG. 6 shows entries of a forward map data structure configured in accordance with some embodiments to access the data shown in FIG. 5.

FIG. 7 shows a format for header information written to the data structure of FIG. 5 in some embodiments.

FIG. 8 shows further aspects of the SSD that use the data structures of FIGS. 6-7.

DETAILED DESCRIPTION

The present disclosure generally relates to managing data stored in a memory, such as but not limited to a flash memory of a solid state drive (SSD).

A wide variety of data storage memories are known in the art. Some memories are formed from solid-state memory cells which store data in relation to an amount of accumulated charge on a floating gate structure, such as with flash memory. An erasure operation is generally required before new data can be written to a given flash memory location.

Map structures are often used to track the physical locations of user data stored in a non-volatile memory (NVM) of a storage device to enable the device to locate and retrieve previously stored data. Such map structures may associate logical addresses for data blocks received from a host with physical addresses of the media, as well as other status information associated with the data.

The management of map structures can provide a significant processing bottleneck to a storage device controller in servicing access commands (e.g., read commands, write commands, status commands, etc.) from a host device. Depending on granularity and workload, such map structures can be relatively large with many entries which are updated as new versions of data are written to new locations in the flash array. Because of the critical nature of the map structures, further processing resources are required to ensure that multiple redundant copies of the map data are updated and stored in NVM.

Various embodiments of the present disclosure are generally directed to an apparatus and method for managing data in a memory, such as but not limited to a flash memory in a solid state drive (SSD). As explained below, some embodiments provide a controller circuit configured to communicate with a memory module. The memory module comprises a memory module electronics (MME) circuit and a non-volatile memory (NVM). The NVM is formed from a plurality of solid-state non-volatile memory cells, such as a flash memory array.

A map structure such as in the form of a forward table is maintained in memory by the controller circuit to associate logical addresses of user data blocks with physical addresses in the NVM. The map structure takes a low overhead map configuration so that multiple successive logical entries do not store redundant information. Location and offset information is incorporated directly into the map structure, enabling the controller circuit to efficiently locate and process the requested data.

Figure 1:
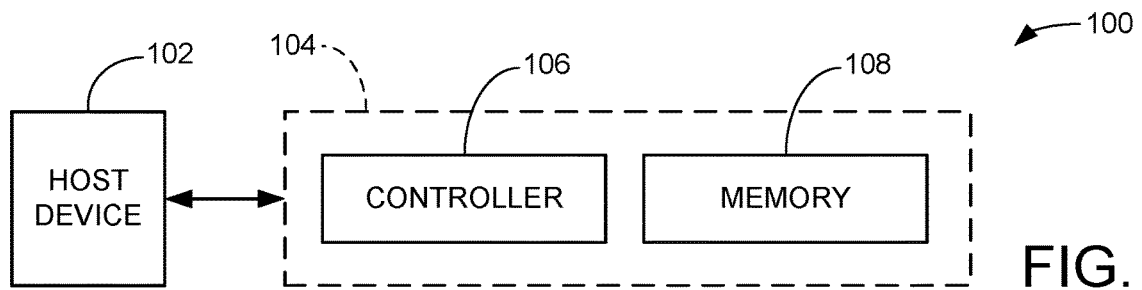
FIG. 1 provides a functional block representation of a data storage device in accordance with various embodiments.

These and other features and advantages of various embodiments of the present disclosure can be understood beginning with a review of FIG. 1 which provides a functional block representation of a data processing system 100. The system includes a host device 102 and a data storage device 104. The data storage device 104 includes a controller circuit 106 and a memory module 108.

The controller circuit 106 is a programmable processor and/or hardware based circuit that provides top level communication and control functions for data transfers to and from non-volatile memory (NVM) storage in the memory module 108. The data transfers between the host device and the data storage device may be provided via a selected protocol.

Figure 2:
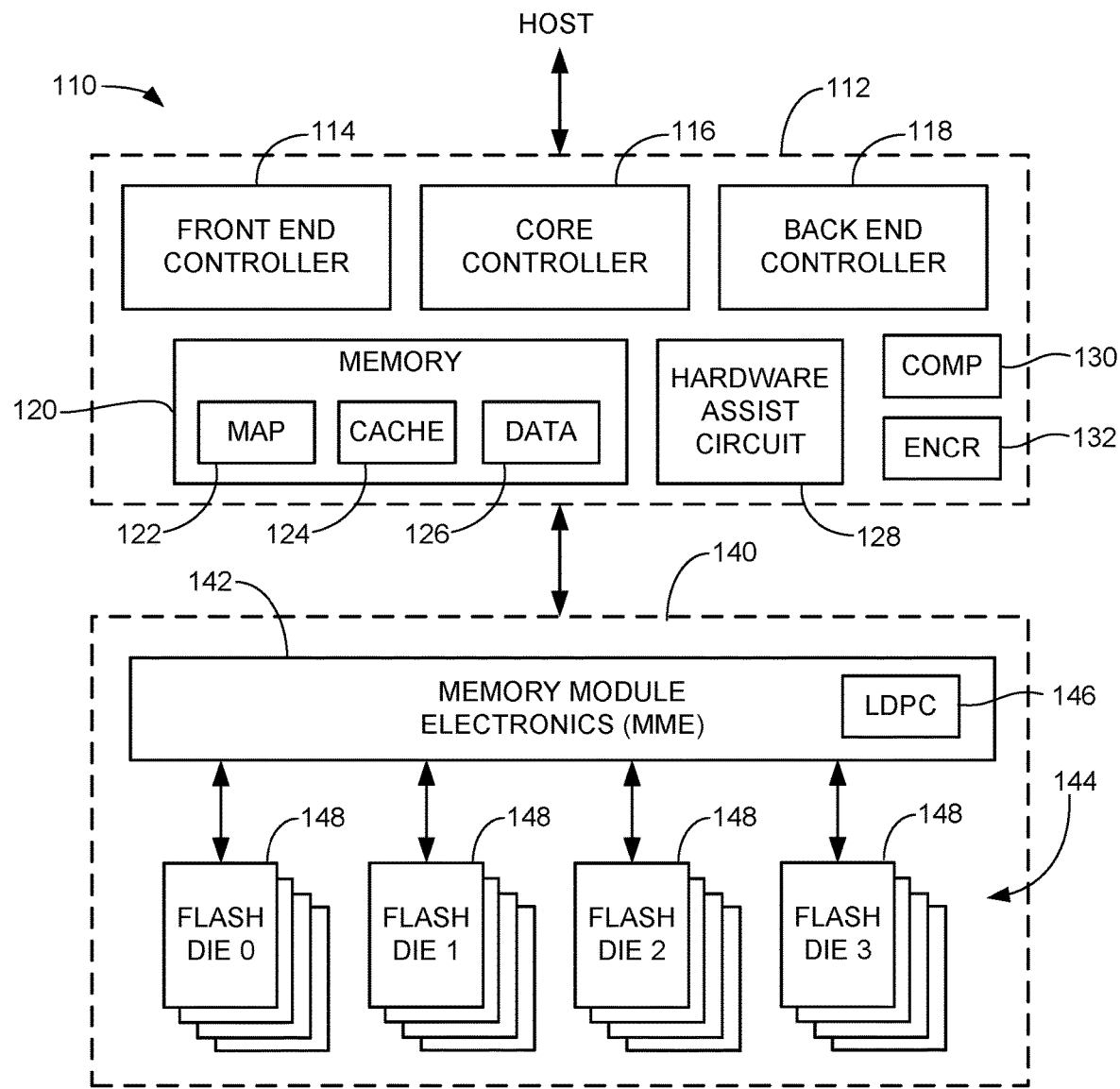
FIG. 2 shows aspects of the device of FIG. 1 characterized as a solid state drive (SSD) in accordance with some embodiments.

FIG. 2 shows a data storage device 110 generally corresponding to the device 104 in FIG. 1. The device 110 is configured as a solid state drive (SSD) that communicates with a host device such as 102 in FIG. 1 via one or more Peripheral Component Interface Express (PCIe) ports, although other configurations can be used.

The SSD 110 includes a controller circuit 112 and a memory module 140. The controller circuit 112 (hereinafter "controller") includes a front end controller 114, a core controller 116 and a back end controller 118. The front end controller 114 performs host I/F functions, the back end controller 118 directs data transfers with the memory module 140 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional circuits that form the controller 112 may include a compression circuit 130 to perform data compression/decompression operations, and an encryption engine circuit 132 to perform various cryptographic functions such as encryption, decryption, hashes, signatures, etc. The compression and cryptographic functionality of these circuits may be realized in hardware and/or firmware, and may take various types as required.

FIG. 2 further shows a memory module 140 generally corresponding to the memory 108 in FIG. 1. The memory module 140 includes a memory module electronics circuit 142 (hereinafter "MME") and a flash memory array 144. The MME 142 includes read/write/erase (R/W/E) circuitry and other control circuitry incorporated into the memory module 140 to write data to the flash memory 144. The MME may be formed of one or more programmable processor circuits with associated programming in memory, and/or hardware circuits adapted to carry out various commands and data transfers with the controller 112. The MME circuit 142 may include additional circuitry such as an LDPC encoder/decoder circuit 146 to generate LDPC (low density parity check) codes which are useful to detect and correct bit errors in data during subsequent read operations.

The flash memory 144 includes a number of flash dies 148 (referred to as die 0 to die 3). While only three dies are shown, any number can be used. The MME 142 can operate to carry out parallel data transfer operations along each of the channels (lanes) established with the associated dies 148. The flash memory may be arranged as a single storage tier, or as multiple tiers as required.

While not limiting, it will be recognized by those skilled in the art that current generation SSDs and other data storage device systems can be formed from integrated memory modules such as 140 that are commercially available from a source of such devices. The memory modules may be integrated into an SSD by a device manufacturer which supplies the controller functions and tailors the controller to operate with the memory module. The controller and memory module are thus separate operational entities which communicate across one or more defined data and command interfaces. A "pull" system is commonly used in which the controller 112 issues commands and then repetitively checks (polls) the status of those commands by the memory module 140 to determine whether the commands have been completed.

Figure 3:
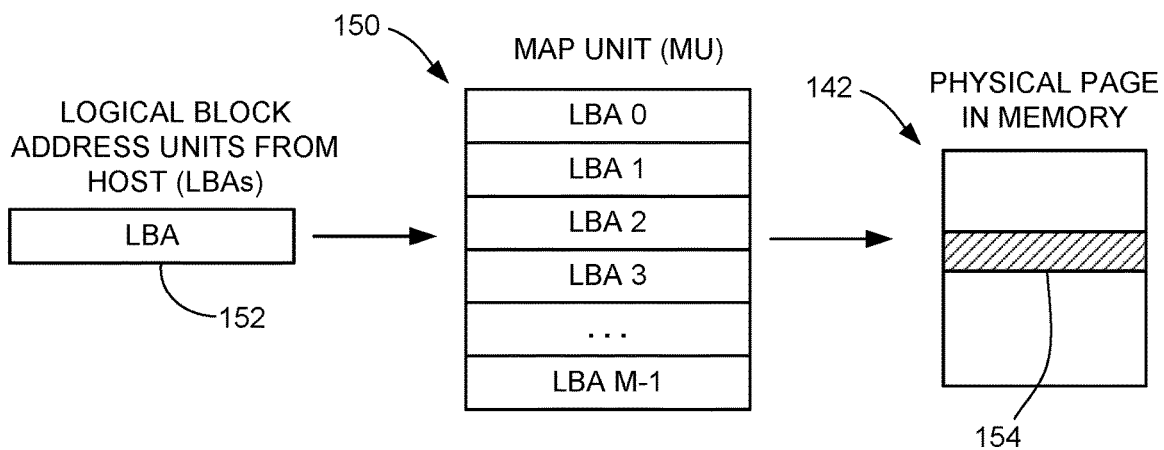
FIG. 3 illustrates a manner in which logical block address units (blocks or LBAs) are arranged into multi-block map units (MUs) for storage in the flash memory of FIG. 2 in some embodiments.

FIG. 3 shows an arrangement of a multi-block data structure referred to herein as a map unit (MU) 150. The map unit 150 represents a block of data of selected size formed from one or more input logical block address units 152 (LBAs) from the host 102. The LBAs 152 are logically referenced using a suitable host format (e.g., host LBA values, key-store values, virtual block addresses, etc.) and will generally have a fixed amount of user data. The MU 150 in turn forms a larger block of data. Data are written and read from the flash memory at the MU level (or greater). Exemplary sizes may be 512 bytes, B of user data in each of the LBAs 152 and 4 KB (4096B) of user data in each MU 150, although other respective values may be used.

Depending on size, one or more MUs 150 are arranged for storage in a page 154 of the flash memory 144. The flash dies 148 are arranged into garbage collection units (GCUs) of erasure blocks that span multiple dies. Erasure blocks represent the smallest increment of the flash memory that can be erased at one time. Each page represents a row of memory cells in a given erasure block that all share a common control line (e.g., word line) and thus represents the smallest increment of data that can be written or read at a time. Multiple pages of data can be written to the same row of memory cells using multi-level cell (MLC), three-level cell (TLC), four-level cell (FLC) techniques, etc. The page size can vary but common values include 8 KB, 16 KB, etc.

Figure 4:
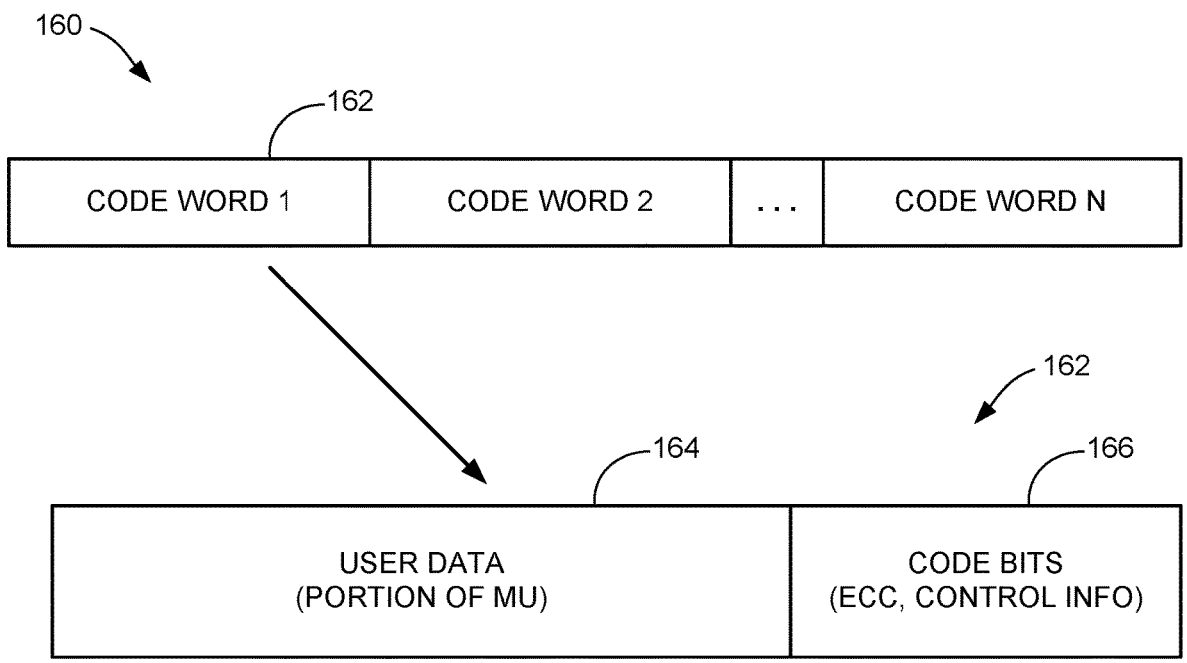
FIG. 4 shows an arrangement of a page of memory in the flash array as an integer number of code words.

FIG. 4 shows an arrangement of code words 160 that are written to each page 154. Generally, each page 154 is divided up into an integer number N of code words 160, where N is any suitable plural number. N may be divisible by 2, but such is not required.

Each code word includes a user data portion 164 and a code bits portion 166. The user data portion 164 constitutes bits from the user data portion of the MU 150 (FIG. 3) as well as other associated information (e.g., IOEDC values, etc.). The code bits 166 constitute control data and may include LDPC (low density parity check) error correction codes, status information, etc.

Figure 5:
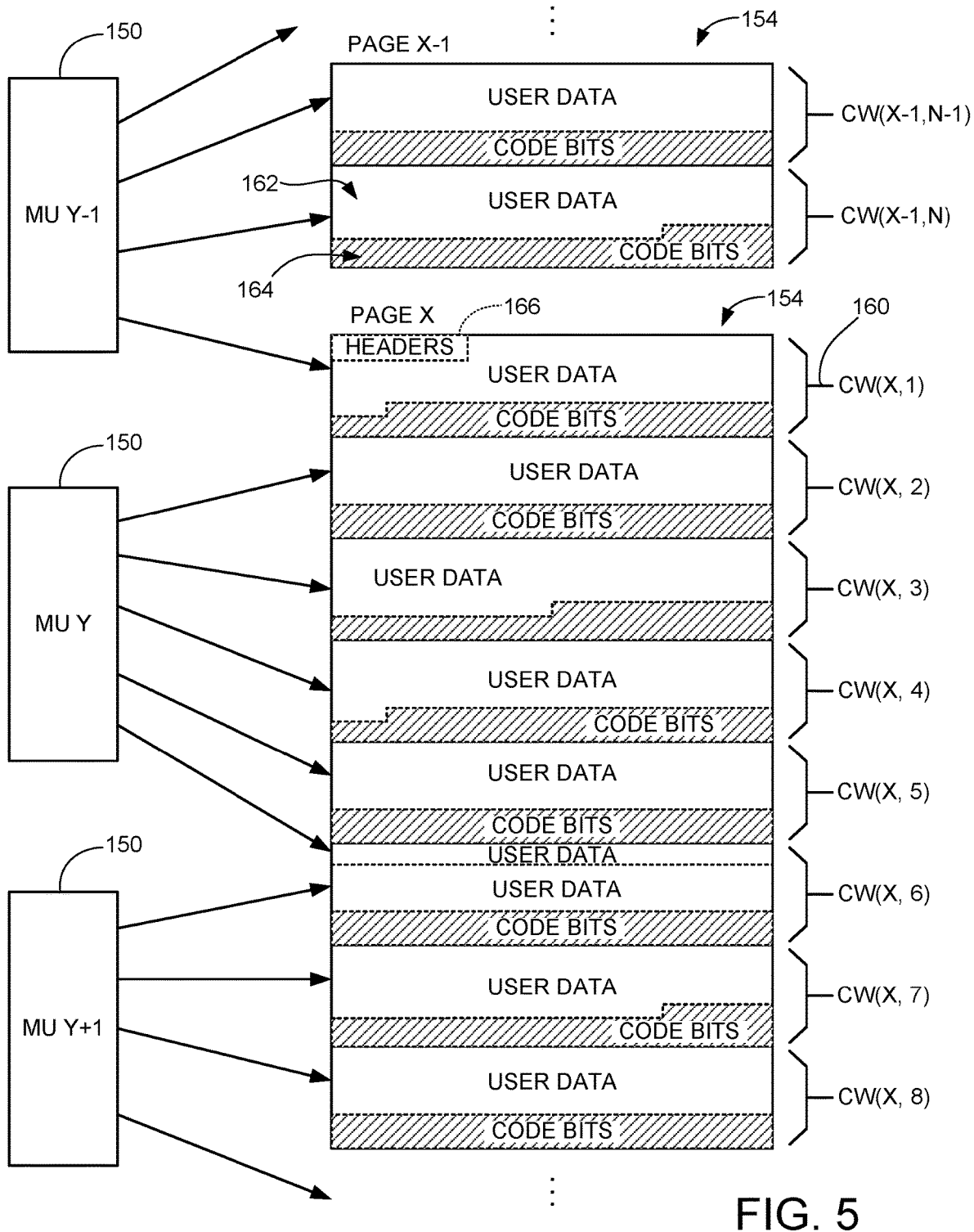
FIG. 5 is a mapping diagram to illustrate how various map units are distributed across adjacent code words across adjacent pages in some embodiments.

FIG. 5 illustrates a manner in which various MUs 150 from FIG. 3 may be written to adjacent code words 160 in adjacent pages 154 of the flash memory 144 in some embodiments. FIG. 5 shows portions of two successive pages denoted as page X−1 and page X. It is contemplated that the respective pages X−1 and X are physically successive in the flash memory, such as on adjacent word lines, although such is not necessarily required.

The last two code words 160 in page X−1 are denoted as CW (X−1, N−1) and CW (X−1, N). The first eight (8) code words 160 of Page X are denoted as CW (X, 1) through CW (X, 8). The blank portions of each code word represent the user data portions 162 and the hashed portions of each code word represent the code bit portions 164 (see FIG. 4). A header block is represented at the beginning of Page X.

Three successive map units 150 are written to the various code words. The map units are denoted as MU Y−1, MU Y and MU Y+1. The user data portions 162 of the code words 160 are supplied by the controller 112. At least portions of the code bits in the portions 164 may be generated by the MME 142 (FIG. 2) based on a selected code rate and other factors. If the LDPC decoding from LDPC circuit 146 is carried out at the MME level, then the data returned to the controller 112 by the MME 142 is stripped of the code bits and constitutes the previously submitted MU data (user data plus embedded ECC data, etc.).

It follows that the various MUs 150 may be distributed across multiple adjacent code words 160, and in some cases, may span multiple adjacent pages 154. This is particularly true if the MUs are subjected to lossless compression by the compression circuit 130, since depending on the compression rate and code rate, boundaries between MUs may not fall at code word boundaries. To illustrate this, code word CW (X, 6) is shown to include the last part of the user data from MU Y and beginning portions of the user data from MU Y+1.

To retrieve a selected LBA from MU Y, the retrieval sequence includes reading and processing the entire contents of Page X, followed by identifying the code words that store portions of MU Y (in this case, code words CW (X, 2) through CW (X, 6)), followed by segregating out the data for MU Y and locating the individual data bits for the selected LBA.

FIG. 6 shows various entries for a forward table 170 formatted in accordance with various embodiments to track the locations of the various MUs 160 stored in the flash memory 144. Other formats may be used so that the table 170 is merely exemplary and is not limiting. Additional control data may be incorporated into the table as well, such as status information, forward pointers, etc., but such have been omitted for clarity.

The forward table 170 is a map structure stored in a local memory (e.g., memory 120, FIG. 2) which is accessed by the controller 112 to locate various MUs 150 in the flash memory 144. The map structure may take the form of a look up table that is accessed by logical address (e.g., LBA value) or other logical input (column 172). It is noted that the LBAs and corresponding MUs are arranged sequentially; the scheme used in FIG. 6 is particularly suitable for large scale sequential accesses, although such is not necessarily required.

In the arrangement shown in FIG. 6, each entry (e.g., row) in the map structure is associated with a logical address (LBA), and the map contains sufficient information to enable the SSD to directly address any desired MU in a given page that contains a selected LBA. This is merely by example; in another arrangement, each map entry in the table is for a selected MU, and then each MU in turn is associated with one or more LBAs. The information in the map structure 170 includes an address field (column 174), an MU offset field (column 176) and an MU length (column 178).

The address information stored in the address field is shown to include various physical block address (PBA) elements including die, GCU and page. Other addressing information can be incorporated as well. The MU offset information indicates the beginning bit from the start of the selected page at which the associated MU begins. The MU length information indicates how many bits from this point until the end of the MU.

This information is sufficient to enable the system to locate any desired MU. It is unnecessary to repeat these values for each of the entries for the LBAs associated with a selected MU; a single listing of this information in the table will suffice. Similarly, all of the MUs (or portions thereof) stored in the same die, GCU and page share this same address information, so a single copy is sufficient and it is unnecessary to repeat this information as well. It is noted that the omitted address information can span multiple pages if sequential pages are used.

Accordingly, to reduce the amount of map information stored to the flash media, a compression technique is utilized that leverages the expectation that the user data will be highly sequential. This enables the map structure 170 to eliminate fields that do not change between sequential units. For example, MUs Y and Y+1 are both written to the same flash page (Page X in FIG. 5), so the address information for MU Y is also used for MU Y+1 in the table. This information can be replaced (associated with MU Y+1) when read back to the local read buffer as required. At the same time, FIG. 6 shows that new MU offset and length information is inserted into the table at the beginning of MU Y+1. Similar map compression techniques can be utilized for other forms of data as well, such as map pages used to indicate the locations of the forward table entries.

In this way, only a single occurrence of the physical address information is supplied to the table for all of the MUs written to that page. Similarly, only a single listing of the MU offset and MU length is provided for each MU written to the page. It is noted that the remaining entries after the first entry are left blank in the areas corresponding to columns 174, 176 and 178. As desired, an index value can be incorporated into the single address to indicate, to the controller circuit, how many entries correspond to the address. Similar index notation can be provided for each single occurrence of the MU offset and MU length for each MU in the page.

Because of the compressed arrangement of the map structure 170, during a data access the controller 112 does not need to access separate header information within the physical page itself in order to locate the various MUs. Boundaries for individual LBAs can be easily calculated by the controller circuit from the MU offset and MU length values. This saves multiple reads or multiple accesses upon the retrieved page data.

It will be recalled that FIG. 5 does provide a header field 166. This header information is still useful during recovery and recycling operations where data may be subjected to background processing such as during garbage collection, but is not normally accessed during data transfers with the host.

FIG. 7 provides an exemplary format for the headers 166. The headers 166 may be grouped all together in one location within the page 154, since it is not necessary to distribute the headers throughout the code words 160. A standardized location can be selected, such as the beginning of the page, the beginning of the first whole MU within the page, etc. Additional control information in the map structure 170 of FIG. 6 and/or the headers 166 of FIG. 7 can include the total number of MUs stored to the associated page, whether any MUs span to a next page, etc. For each MU in the associated page, the headers 166 include an MU address field 180 and an MU length field 182.

FIG. 8 shows further aspects of the SSD 110 in some embodiments. The core CPU 116 operates using a non-volatile write cache 184 and a volatile read buffer 186 to transfer data with the MME 142. MUs are assembled and placed into the write cache pending writing to the flash memory 144 during the servicing of a write command from the host. During the servicing of a subsequent read command from the host, the MUs are retrieved, disassembled and placed into LBA format in the read buffer for transfer to the host device 102. To retrieve a given MU, the controller essentially needs to simply locate and read the associated forward table entry to determine the start and length of the desired MU. The code word offset and span information can be calculated based on the information from the table 170.

Figure 9:
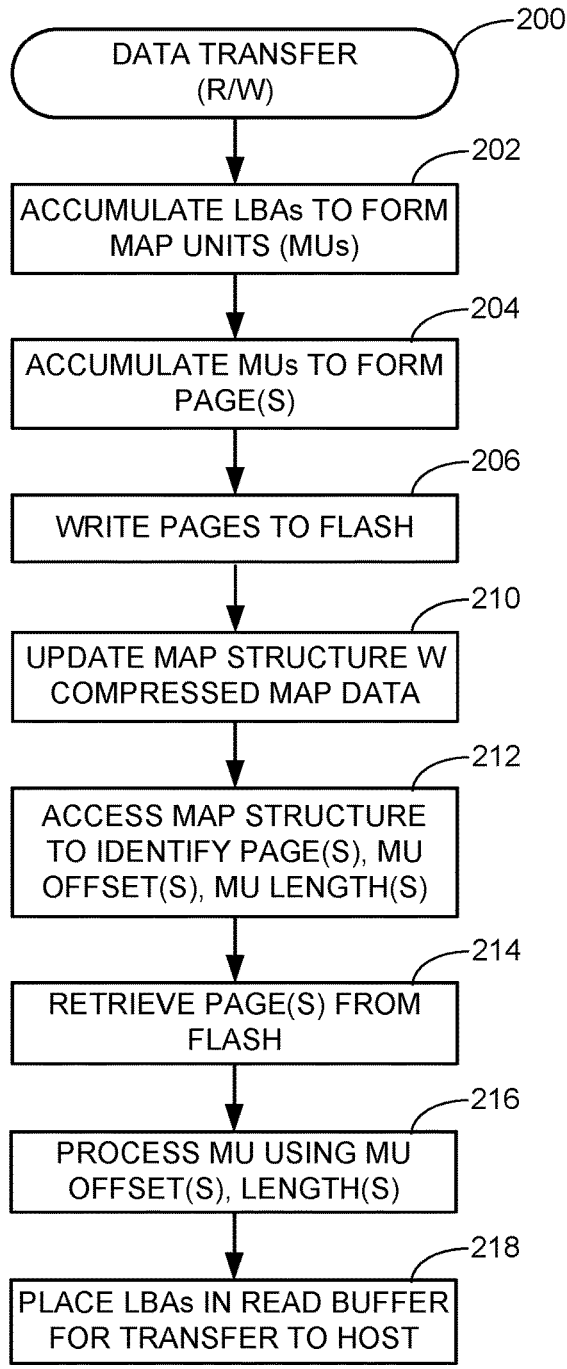
FIG. 9 is a flow chart for a data transfer (R/W) routine illustrative of steps carried out by the SSD in accordance with some embodiments to perform data transfer operations with the flash memory.

FIG. 9 is a flow chart to illustrate a data transfer (R/W) routine 200 carried out by the SSD 110 using the map structure 170 of FIG. 6. The steps are merely illustrative and are not limiting, and may represent programming executed by one or more processors/hardware circuits of the SSD to write user data to and read user data from the flash memory 144.

At step 202, a data write operation is serviced responsive to a data write command from the host. The write command will include the associated LBAs to be written to flash. The controller 112 accumulates the various LBAs into one or more MUs in the write buffer. As noted above, it is contemplated that the LBAs will be arranged in a logical sequential order, although such is not necessarily required. In some cases, the data may be received in one logical order and the controller will rearrange the data to place the data, in the MUs, in a different logical (sequential) order.

At step 204, the SSD proceeds to accumulate sufficient MUs to fill one or more pages of data. The data are thereafter supplied to the MME 142 which operates to encode the data into code words and write the code words to the flash memory, step 206. The map structure 170 is thereafter updated as arranged in FIG. 6 to indicate the various information therein (e.g., MU addressing, offset and length, etc.). As an aside, the map structure may be maintained/loaded in local volatile memory to enable write-in-place updates, with background copying and journaling operations taking place on a regular basis to maintain one or more updated maps stored in NVM.

A subsequent read operation is serviced responsive to a data read command from the host. The read command may be formatted as a request for a selected range of LBAs to be retrieved from the flash memory. At step 212, the controller 112 accesses the associated entries for the map structure 170 associated with the MU(s) that include the requested data. This includes identification of the physical page address (PBA) of the page or pages to be retrieved, as well as the various MU offset(s) and length(s). The command is forwarded to the MME 142 which retrieves the requested page(s) from flash at step 214.

The received data blocks are processed by the controller using the data from the map structure (rather than from the embedded header information) at step 216, and the data are arranged in the read buffer for subsequent transfer to the requesting host at step 218.

Figure 10:
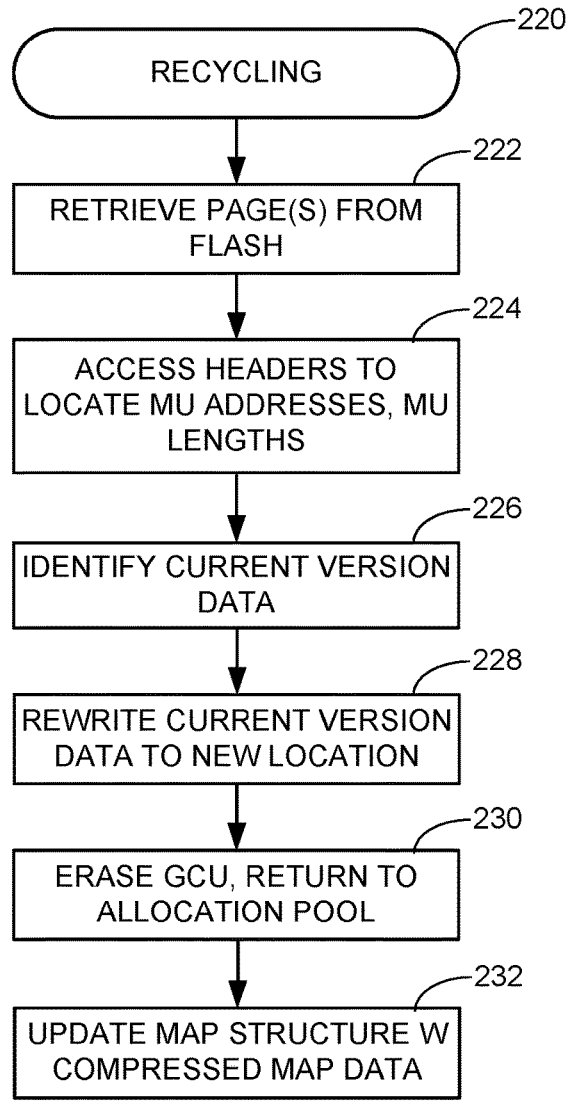
FIG. 10 is a flow chart for a recycling routine illustrative of steps carried out by the SSD in accordance with some embodiments to perform data recycling operations with the flash memory.

FIG. 10 is a recycling routine 220 to show further aspects of various embodiments in accordance with the foregoing discussion. As noted above, the routine may be carried out during background processing such as garbage collection operations to copy valid data, erase garbage collection units (GCUs) and return such to an allocation pool for subsequent allocation.

At step 222, one or more pages of data are retrieved from flash memory. The header information from the headers 166 (FIG. 7) is accessed to locate each of the MUs stored in the associated pages, step 224. From this, current version data blocks that need to be retained can be identified by the controller at step 226. The data are rearranged and rewritten to new locations, step 228, after which the MME 142 operates to erase the GCU and return the GCU to an allocation pool pending subsequent allocation for the storage of new data. As required, the map structure is updated to reflect the new locations of the relocated data, step 232.

In this way, the SSD 110 can be viewed as including a memory module (such as 140) comprising a non-volatile memory (NVM) (flash 144) and a memory module electronics (MME) circuit (such as 142) configured to program data to and read data from solid-state non-volatile memory cells of the NVM.

A map structure (such as table 170, FIG. 6) is stored in a memory (such as memory 120, FIG. 2). The map structure associates logical addresses of user data blocks with physical addresses in the NVM at which the user data blocks are stored (see e.g., columns 172, 174). A controller circuit (such as 112, FIG. 2) is configured to arrange the user data blocks into map units (MUs) (such as 150, FIG. 3). Each MU has multiple user data blocks (such as LBAs 152) arranged with the associated logical addresses in sequential order (see e.g., FIG. 3).

The controller circuit is configured to direct the MME circuit to write a plurality of the MUs to a selected page (such as 154) of the NVM arranged as an integer number of code words (such as 160; see FIGS. 4-5). The controller circuit is further configured to update the map structure to list only a single occurrence of a physical address for all of the MUs written to the selected page (see e.g., FIG. 6, column 174), and to list an MU offset and an MU length for all of the multiple user data blocks in each of the MUs written to the selected page (FIG. 6, columns 176, 178).

It will now be appreciated that the various embodiments presented herein can provide a number of advantages. Map compression enables a smaller, more efficient footprint for the map structure 170, as well as providing common data for the various MUs that are stored in a given page. By eliminating the need to read the header information stored to the media in order to locate the various MUs, processing steps such as extra reads, data decompression, decryption, etc. can be avoided. Since the header information that is stored to the media is not accessed during normal operations (but is during recycling), the headers can be placed in a more convenient location, such as a page or MU boundary, or at a predetermined location within the page (e.g., page X, offset Y, etc.).

While various embodiments have been described in the environment of a flash memory, such is merely illustrative. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
 a memory module comprising a non-volatile memory (NVM) arranged as a plurality of pages; and
 a controller circuit configured to arrange user data blocks supplied by a host device for storage to the NVM into map units (MUs), each MU comprising multiple ones of the user data blocks arranged with associated logical addresses in sequential order, the controller circuit further configured to direct the memory module to write a plurality of the MUs to a selected page of the NVM arranged as an integer number of code words, and to update a map structure in a local memory to list only a single occurrence of a physical address of the memory module for all of the MUs written to the selected page.

2. The apparatus of claim 1, wherein the controller circuit is further configured to list, in the map structure, an MU offset and an MU length for all of the multiple user data blocks in each of the MUs written to the selected page.

3. The apparatus of claim 2, wherein the single occurrence of the physical address comprises a die address, a garbage collection unit (GCU) address, and a page address for the selected page, wherein the MU offset comprises a total number of intervening bits from the first bit of the selected page to the first bit of the associated MU, and the MU length comprises a total number of bits from the first bit of the associated MU to the last bit of the associated MU, and wherein the controller circuit is configured to access the single occurrence of the physical address, the MU offset and the MU length from the map structure for any of the logical addresses of the user data blocks in a selected MU from the plurality of MUs written to the selected page.

4. The apparatus of claim 3, wherein the controller circuit is further configured to access the single occurrence of the physical address from the map structure for any logical addresses of user data blocks in a second selected MU written to the selected page.

5. The apparatus of claim 1, wherein the controller circuit is further configured to retrieve at least one selected user data block from the NVM by accessing the map structure to identify a location within the selected page at which the selected user data block is stored.

6. The apparatus of claim 1, wherein the memory module further comprises a memory module electronics (MME) circuit configured to program the MUs to the selected page responsive to a write command from the controller circuit.

7. The apparatus of claim 1, wherein the controller circuit is further configured to apply data compression to each of the plurality of MUs written to the selected page.

8. The apparatus of claim 1, wherein the controller circuit is further configured to apply encryption to each of the plurality of MUs written to the selected page.

9. The apparatus of claim 1, wherein each of the code words comprises a user data portion and a code bit portion, the user data portion comprising data bits for user data from the multiple user data blocks in the plurality of MUs, the code bit portion comprising LDPC bits used by an LDPC decoder circuit to detect and correct errors during a read operation.

10. The apparatus of claim 1, wherein the controller circuit is further configured to retrieve at least one selected user data block from the flash memory by accessing the map structure to identify a location within the selected page at which the selected user data block is stored.

11. The apparatus of claim 1, wherein the flash memory further comprises a memory module electronics (MME) circuit configured to program the MUs to the selected page responsive to a write command from the controller circuit.

12. The apparatus of claim 1, wherein the single occurrence of the physical address comprises a die address, a garbage collection unit (GCU) address, and a page address for the selected page, wherein the MU offset comprises a total number of intervening bits from the first bit of the selected page to the first bit of the associated MU, and the MU length comprises a total number of bits from the first bit of the associated MU to the last bit of the associated MU, and wherein the controller circuit is configured to access the single occurrence of the physical address, the MU offset and the MU length from the map structure for any of the logical addresses of the user data blocks in a selected MU from the plurality of MUs written to the selected page.

13. A solid state drive (SSD), comprising:
a flash memory comprising programmable flash memory cells arranged into a plurality of pages on each of a plurality of semiconductor memory dies;
a local memory configured to store a map structure that associates logical addresses of user data blocks supplied by a host device with physical addresses of the flash memory at which the user data blocks are stored; and
a controller circuit configured to arrange a set of user data blocks into map units (MUs), each MU comprising multiple ones of the user data blocks arranged with associated logical addresses in sequential order, the controller circuit further configured to direct the flash memory to write a plurality of the MUs to a selected page of the flash memory arranged as an integer number of code words, and to update the map structure in the local memory to list only a single occurrence of a physical address of the flash memory for all of the MUs written to the selected page, the controller circuit further configured to list, in the map structure, an MU offset and an MU length for all of the multiple user data blocks in each of the MUs written to the selected page.

14. The SSD of claim 10, wherein each of the code words comprises a user data portion and a code bit portion, the user data portion comprising data bits for user data from the multiple user data blocks in the plurality of MUs, the code bit portion comprising LDPC bits used by an LDPC decoder circuit to detect and correct errors during a read operation.

15. A method comprising:
arranging, by a controller circuit, a plurality of user data blocks received from a host into each of a plurality of map units (MUs), the user data blocks in each MU having logical addresses arranged in sequential order;
configuring the plurality of MUs into an integer plural number of code words;
writing the integer number of code words to a selected page in a non-volatile memory (NVM); and
updating, by the controller circuit, a map structure stored in a memory which associates logical addresses of user data blocks with physical addresses in the NVM at which the user data blocks are stored to list only a single occurrence of a physical address for all of the MUs written to the selected page.

16. The method of claim 15, wherein the single occurrence of the physical address comprises a die address, a garbage collection unit (GCU) address, and a page address for the selected page.

17. The method of claim 15, wherein the updating step further comprises listing, in the map structure, an MU offset and an MU length for all of the multiple user data blocks in each of the MUs written to the selected page.

18. The method of claim 17, wherein the MU offset comprises a total number of intervening bits from the first bit of the selected page to the first bit of the associated MU, and the MU length comprises a total number of bits from the first bit of the associated MU to the last bit of the associated MU, and wherein the controller circuit is configured to access the single occurrence of the physical address, the MU offset and the MU length from the map structure for any of the logical addresses of the user data blocks in a selected MU from the plurality of MUs written to the selected page.

19. The method of claim 15, wherein each of the integer plurality of code words comprises a user data portion and a code bit portion, the user data portion comprising data bits for user data from the multiple user data blocks in the plurality of MUs, the code bit portion comprising LDPC bits used to detect and correct errors during a read operation.

20. The method of claim 15, wherein the controller circuit comprises a programmable processor circuit of a solid state drive (SSD), and wherein the NVM comprises flash memory of the SSD.

21. An apparatus, comprising:
a memory module having a non-volatile memory (NVM) arranged as a plurality of pages;
a map structure stored in a local memory and configured to associate logical addresses of user data blocks with physical addresses of the NVM at which the user data blocks are stored, the map structure listing only a single occurrence of a physical address of the NVM for all of the user data blocks written to a selected page; and
a controller circuit configured to arrange sequential user data blocks into map units (MUs), the controller circuit further configured to write a plurality of the MUs to the selected page of the NVM arranged as an integer number of code words, and to update the map structure to list the single occurrence of a physical address of the NVM for all of the MUs written to the selected page.

22. The apparatus of claim 21, wherein the controller circuit is further configured to list, in the map structure, an MU offset and an MU length for all of the multiple user data blocks in each of the MUs written to the selected page.

23. The apparatus of claim 22, wherein the single occurrence of the physical address comprises a die address, a garbage collection unit (GCU) address, and a page address for the selected page, wherein the MU offset comprises a total number of intervening bits from the first bit of the selected page to the first bit of the associated MU, and the MU length comprises a total number of bits from the first bit of the associated MU to the last bit of the associated MU, and wherein the controller circuit is configured to access the single occurrence of the physical address, the MU offset and the MU length from the map structure for any of the logical addresses of the user data blocks in a selected MU from the plurality of MUs written to the selected page.

* * * * *